US012198060B2

United States Patent
Bai et al.

(10) Patent No.: US 12,198,060 B2
(45) Date of Patent: Jan. 14, 2025

(54) SYSTEMS AND METHODS FOR MUTUAL INFORMATION BASED SELF-SUPERVISED LEARNING

(71) Applicant: Salesforce.com, Inc., San Francisco, CA (US)

(72) Inventors: Junwen Bai, Ithaca, NY (US); Weiran Wang, Palo Alto, CA (US); Yingbo Zhou, Mountain View, CA (US); Caiming Xiong, Menlo Park, CA (US)

(73) Assignee: Salesforce, Inc., San Francisco, CA (US)

(*) Notice: Subject to any disclaimer, the term of this patent is extended or adjusted under 35 U.S.C. 154(b) by 737 days.

(21) Appl. No.: 17/006,570

(22) Filed: Aug. 28, 2020

(65) Prior Publication Data

US 2022/0067534 A1  Mar. 3, 2022

(51) Int. Cl.
*G06N 3/088* (2023.01)
*G06F 18/21* (2023.01)
*G06F 18/214* (2023.01)
*G06N 3/049* (2023.01)

(52) U.S. Cl.
CPC ......... *G06N 3/088* (2013.01); *G06F 18/2148* (2023.01); *G06F 18/217* (2023.01); *G06N 3/049* (2013.01)

(58) Field of Classification Search
None
See application file for complete search history.

(56) References Cited

U.S. PATENT DOCUMENTS

| 2019/0130251 A1* | 5/2019 | Lao | G06F 16/90332 |
| 2020/0183047 A1* | 6/2020 | Denli | G06N 3/08 |
| 2020/0364504 A1* | 11/2020 | Xu | G06N 3/044 |
| 2020/0394559 A1* | 12/2020 | Zhang | G06N 3/045 |

OTHER PUBLICATIONS

Wu, "Conditional Mutual Information-Based Contrastive Loss for Financial Time Series Forecasting", (May 2020). (Year: 2020).*
Wang et al., "Unsupervised Pre-Training of Bidirectional Speech Encoders via Masked Reconstruction", (May 2020) (Year: 2020).*
Vrooman et al., "Image Processing algorithms for the analysis of phase-shifted speckle inference patterns", (May 1991) (Year: 1991).*
Du et al., "Multivariate time series forecasting via attention-based encoder-decoder framework", (Jan. 2020) (Year: 2020).*

(Continued)

*Primary Examiner* — Alexey Shmatov
*Assistant Examiner* — Beatriz Ramirez Bravo
(74) *Attorney, Agent, or Firm* — Haynes and Boone, LLP

(57) ABSTRACT

Embodiments described herein combine both masked reconstruction and predictive coding. Specifically, unlike contrastive learning, the mutual information between past states and future states are directly estimated. The context information can also be directly captured via shifted masked reconstruction—unlike standard masked reconstruction, the target reconstructed observations are shifted slightly towards the future to incorporate more predictability. The estimated mutual information and shifted masked reconstruction loss can then be combined as the loss function to update the neural model.

20 Claims, 7 Drawing Sheets

(56) References Cited

OTHER PUBLICATIONS

Khare et al., "Mutual Information Approach for Sentiment Analysis Using Deep Machine Learning Convolution Neural Network (CNN) Model", (Jun. 2020) (Year: 2020).*
Shen et al., "Nexus Network: Connecting the Preceding and the Following in Dialogue Generation", (2018). (Year: 2018).*
Clark et al., "Unsupervised discovery of temporal structure in noisy data with dynamical components analysis," in Advances in Neural Information Processing Systems, pp. 14267-14278, 2019.
Oord et al., "Representation learning with contrastive predictive coding," arXiv preprint arXiv:1807.03748, 2018, 13 pages.

* cited by examiner

SYSTEMS AND METHODS FOR MUTUAL INFORMATION BASED SELF-SUPERVISED LEARNING

TECHNICAL FIELD

The present disclosure relates generally to machine learning models and neural networks, and more specifically, to mutual information based self-supervised learning for sequential data.

BACKGROUND

Self-supervised learning can be used to train a neural model without human-annotated datasets and thus is widely used in various downstream scenarios, such as question answering, etc. For example, in natural language processing, self-supervised pretraining may improve both question answering and language interference with minor finetuning, thus saving the time and resource spent to annotate a large amount of dialogues that are usually used to train the natural language processing models. Existing self-supervised learning systems largely rely on masked reconstruction or contrastive learning. However, masked reconstruction requires the prediction of masked inputs based on the left or right contexts, and contrastive learning requires the selection of positive and negative samples, neither of which is efficient to process sequentially input data.

Therefore, there is a need for an efficient self-supervised learning method for sequential data.

Figure 1:
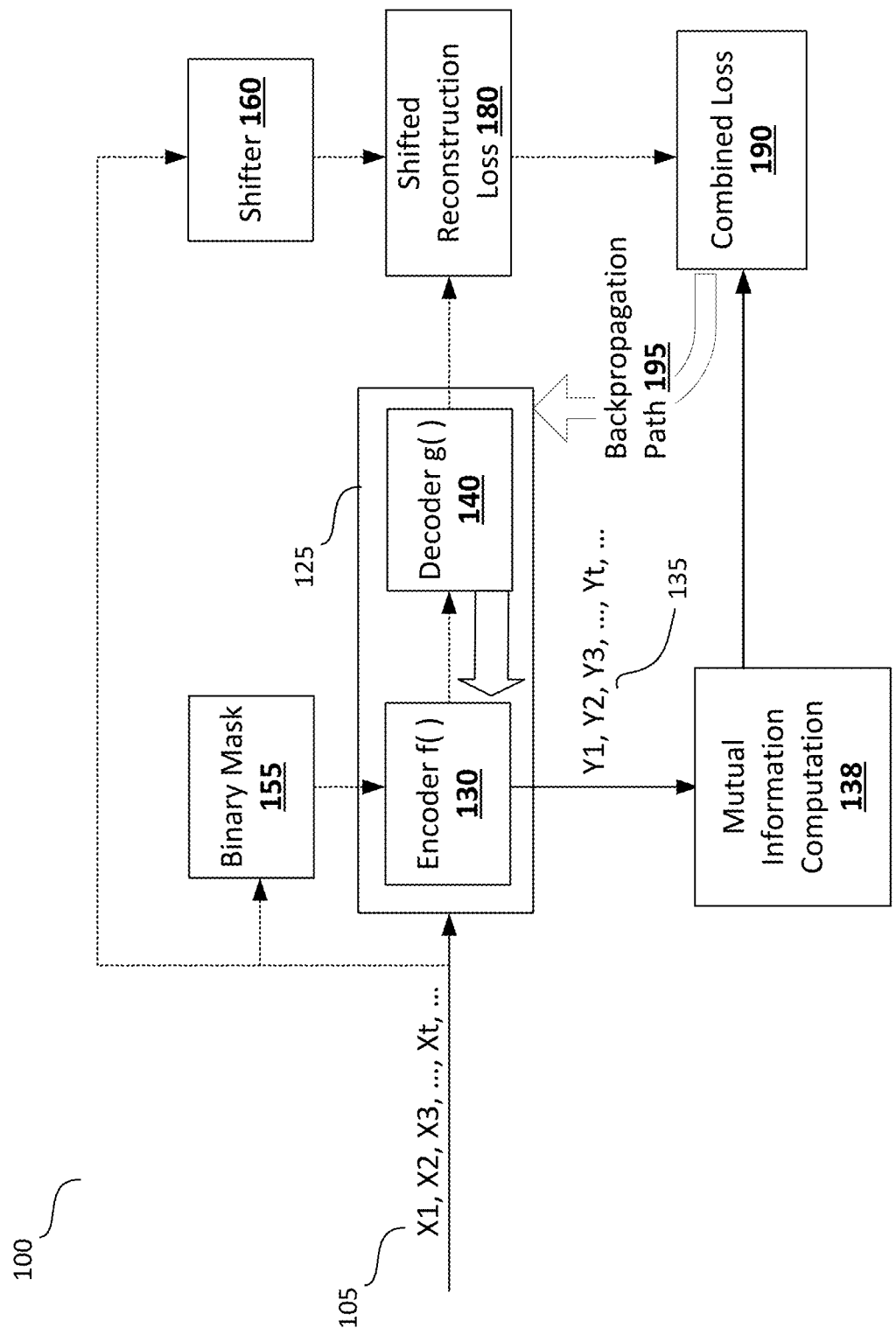
FIG. 1 provides an example block diagram illustrating an aspect of the self-supervised learning approach combining mutual information learning and shifted masked reconstruction, according to one embodiment described herein.

In the figures, elements having the same designations have the same or similar functions.

DETAILED DESCRIPTION

Acquiring annotated labels in training data for neural models can often be expensive and time-consuming. Self-supervised learning can be used to train a neural model without human-annotated datasets and thus is widely used in various downstream scenarios, such as question answering, etc. For example, in natural language processing, self-supervised pretraining may improve both question answering and language interference with minor finetuning, thus saving the time and resource spent to annotate a large amount of dialogues that are usually used to train the natural language processing models. For another example, some speech recognition models also adopt such self-supervised pretraining finetuning strategy Most self-supervised learning techniques adopt two mainstream directions in self-supervised learning for pretraining, masked reconstruction and contrastive learning. Masked reconstruction strategy masks some of the input observations and replace them with predefined tokens. The training objective is to use a bidirectional language model to predict masked inputs based on their left and right contexts. However, the masked reconstruction requires the learnt representations embed neighborhood information from both directions, e.g. left and right contexts, which may not be the most efficient for sequentially input data.

In contrastive learning, the learnt representations are predictive of future in the latent space through an autoregressive manner. However, contrastive learning relies on the selection of positive and negative samples, which may vary a lot for different datasets. Inappropriate sample selection would lead to severe performance degeneracy of the neural model. Thus, selecting positive and negative samples alone may add to the processing complexity of contrastive learning.

In view of the need for an efficient self-supervised learning method for sequential data, embodiments described herein combine both masked reconstruction and predictive coding. Specifically, unlike contrastive learning, the mutual information between past states and future states are directly estimated. The context information can also be directly captured via shifted masked reconstruction—unlike standard masked reconstruction, the target reconstructed observations are shifted slightly towards the future to incorporate more predictability. The estimated mutual information and shifted masked reconstruction loss can then be combined as the loss function to update the neural model.

In this way, the mutual information based predictive coding and shifted masked reconstruction can uncover underlying dynamics from the high dimensional sequence of observations without the tedious process of selecting positive and negative samples, alleviating the burden of tuning of the model training.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Overview

FIG. 1 provides an example block diagram illustrating an aspect of the self-supervised learning approach combining mutual information learning and shifted masked reconstruction, according to one embodiment described herein. Diagram 100 shows a first learning path (shown in solid lines with arrows) which maximizes the mutual information between past and future states, and a second learning path (shown in dashed lines with arrows) which defines the shifted masked reconstruction to fuse the left and right context information. t In one embodiment, an input sequence 105 of observations may be received, denoted by $X=\{x_1, x_2, \ldots\}$, where $x_i \in \mathbb{R}$. Specifically, for any time stamp t and a fixed window size T, $X_t^{past}=\{x_{t-T+1}, \ldots, x_t\}$, $X_t^{future}=\{x_{t+1}, \ldots, x_{t+T}\}$. One goal of the training objective is to maximize the mutual information between $X_t^{past}$ and $X_t^{future}$.

Figure 2:
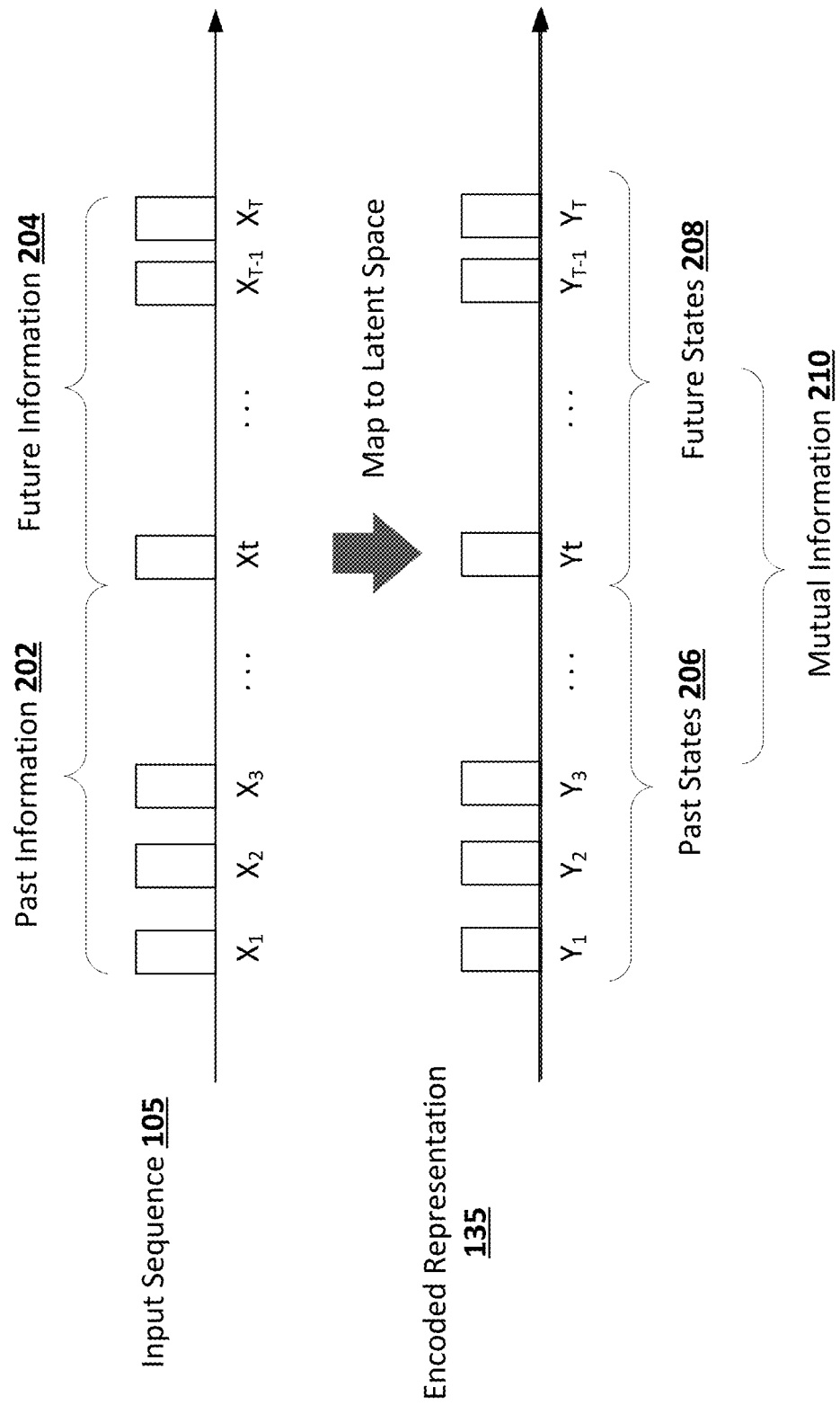
FIG. 2 provides an example diagram illustrating aspects of mutual information in the latent space, according to the embodiments described herein.

For example, FIG. 2 provides an example diagram illustrating aspects of mutual information in the latent space, according to the embodiments described herein. The mutual information between the past information 202 and the future information 204 at time stamp t is defined as $MI(X_t^{past}, X_t^{future})=H(X_t^{past})+H(X_t^{future})-H(X_t^{past}, X_t^{future})$ where H is the entropy function.

The mutual information in the input space is fixed, but a latent space may be learnt that maximizes the mutual information between latent representations. Specifically, learning the latent space may be more advantageous. For instance, the input space is often noisy and biased, but the latent space can extract the core dynamics and makes it easier to estimate more accurate mutual information. For another example, deep neural networks like Transformers, bi-directional long short-term memory (LSTM), and/or the like, may have the capability to extract meaningful information to a low-dimensional space while it is cheaper to enforce structures and derive estimations in a low-dimensional space. Thus, a mature feature extractor such as the Transformer may be adopted to embed the inputs 105 to a low-dimensional space.

In one embodiment, an encoder $f(\ )$ 130 of the base model 125 is employed to encode the inputs 105 X to latent states 135 $Y=\{y_1, y_2, \ldots\}$ where $y_i=e(x_i)\in \mathbb{R}^d$ in the latent space. Thus, the past information 202 and the future information 204 in the input space are mapped to the past states 206 and future states 208 in the latent space, respectively. Since each $y_i$ has length d and the past states 206 $Y_t^{past}$ or future states 208 $Y_t^{future}$ contains T states, $Y_t^{past}$ or $Y_t^{future}$ may be regarded as a dT-size vector, and $(Y_t^{past}, Y_t^{future})$ a 2dT-size vector. The mutual information 210 between the past states 206 and future states 208 can thus be computed in the latent space.

Referring to FIG. 1, the latent state representations 135 are then input to the mutual information computation module 138. If the latent state representations 135 are assumed to form a Gaussian process and any consecutive T states $\{y_i, y_{i+1}, \ldots, y_{i+T-1}\}$ for any number i, come from the same distribution. The mutual information computation module 138 may then estimate the mutual information in the latent space by averaging across all the time stamps. For example, the approximated mutual information is denoted by $I_T$, $$I_T=MI(Y_t^{past}, Y_t^{future})=H(Y_t^{past})+H(Y_t^{future})-H(Y_t^{past}, Y_t^{future})$$

Under the Gaussian assumption, H can be estimated by:

$$H(Y) = \frac{1}{2}\ln(2\pi e)^{dT}\left|\sum\nolimits_T(Y)\right| \text{ for } Y \in \mathbb{R}^{dT}$$

and its covariance matrix $\Sigma_T(Y)\in \mathbb{R}^{dT \times dT}$. In this way, the mutual information $I_T$ can be re-written as:

$$I_T = \frac{1}{2}\ln\left((2\pi e)^{dT}\left|\sum\nolimits_T(Y)\right|\right)\times 2 - \frac{1}{2}\ln\left((2\pi e)^{2dT}\left|\sum\nolimits_{2T}(Y)\right|\right)$$

$$= \ln\left|\sum\nolimits_T(Y)\right| - \frac{1}{2}\left|\sum\nolimits_{2T}(Y)\right|$$

To estimate $\Sigma_{2T}(Y)$, all consecutive 2T-length subsequences are collected as samples. $\Sigma_T(Y)$ can be approximately estimated by the upper left sub-matrix of $\Sigma_{2T}(Y)$.

As the mutual information computation module 138 computes the mutual information, one objective is to maximize $I_T$ in the training. Thus, the computed mutual information is passed to the combined loss module 190.

In one embodiment, the mutual information objective may be similar to Dynamical Component Analysis (DCA), described in Clark et al., Unsupervised discovery of temporal structure in noisy data with dynamical components analysis, in Advances in Neural Information Processing Systems, pp. 14267-14278, 2019, which is hereby expressly incorporated by reference herein in its entirety. The DCA method also optimizes the mutual information between past and future states. However, DCA assumes the input space to be Gaussian and only enforces an orthogonal linear projection. This makes the optimization rather difficult, as most real-world datasets are not perfectly Gaussian. For example, the DCA approach may not perform well with highly nonlinear systems. In addition, as the original DCA is not proposed for training a neural model, replacing the linear projection with a much more powerful neural network may not be applicable. For instance, neural networks may converge to an equilibrium where the neural network may just output similar latent coding that maximizes the mutual information for every time stamp. Such convergence at the equilibrium can be rather uninformative of the inputs. The shifted masked reconstruction learning objective, as shown along the dashed line with arrows in diagram 100, may compensate this issue.

As shown in diagram 100, the input sequence 105 may be applied with a binary mask 155. For example, given a sequence of m-dimensional input observations X of length L, the binary mask module may randomly generate a binary mask M with size m×L, where $M_{i,j}=0$ masks $X_{i,j}$ with 0. The masked inputs from the binary mask module 155 are then fed to the encoder 130f, which encodes the inputs into the latent space. The encoded representations in the latent space are then subsequently sent to the decoder 140 g to decode the latent coding. Typically, the masked reconstruction recovers the masked inputs for the same time stamp. However, to encourage the latent coding to be more predictive of future, the latent coding is decoded a masked future input. Specifically, the decoded output from decoder 140 is sent to the shifted reconstruction loss module 180, at which the decoded output is compared with a shifted input from a shifter 160 which right shifts the input sequence 105 for a number of time steps.

Figure 3:
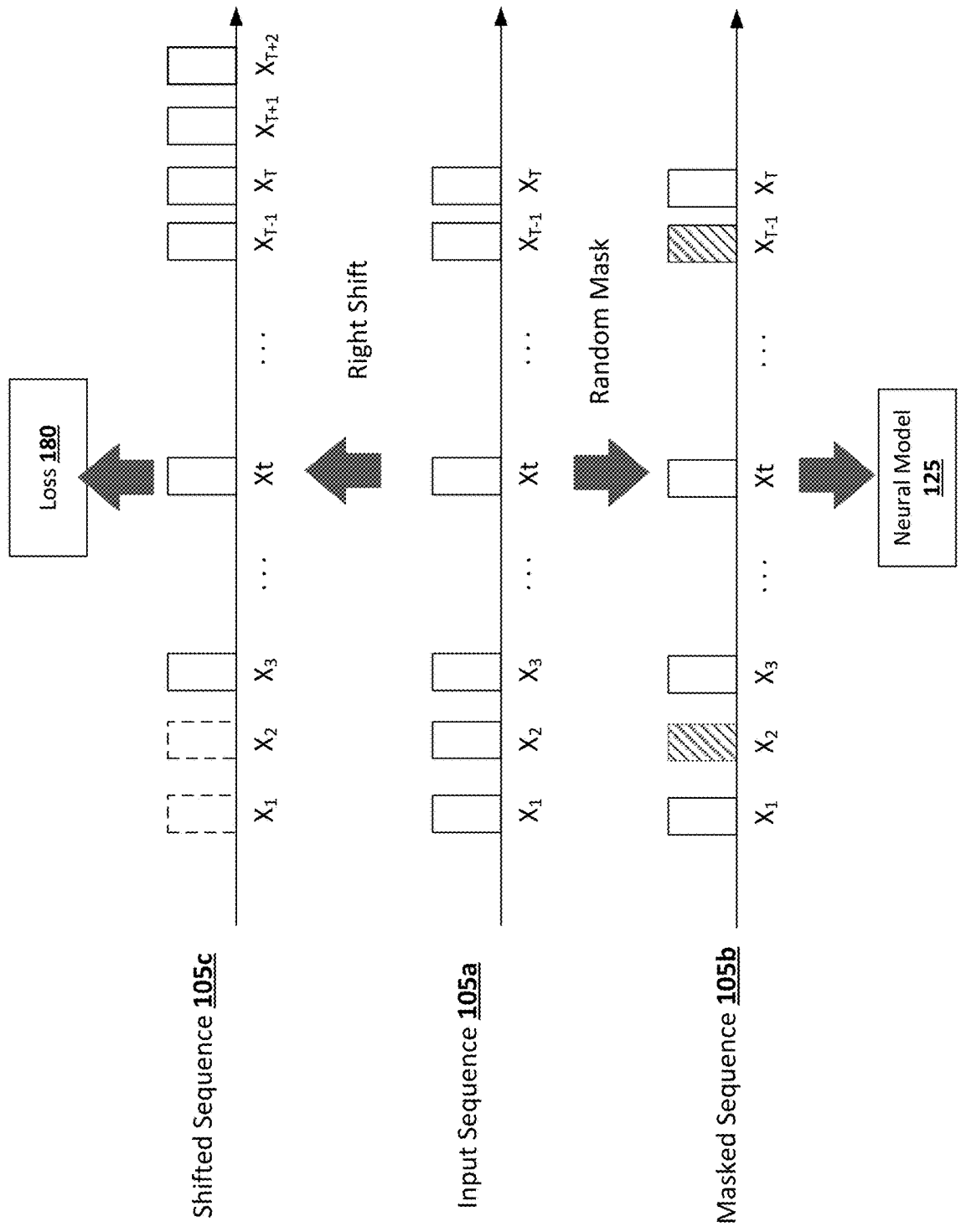
FIG. 3 provides an example diagram illustrating aspects of shifted masked reconstruction, according to embodiments described herein.

For example, FIG. 3 provides an example diagram illustrating aspects of shifted masked reconstruction, according to embodiments described herein. The input sequence 105a shows a sequence of $X=\{x_1, x_2, \ldots, x_T\}$. Some of the observations in the input sequence 105a may be randomly "perturbed," e.g., replaced with a mask token (shown by the shadowed instances), to form the masked sequence 105b. The masked sequence 105b is then input to the neural model 125.

On the other hand, the input sequence 105a is right shifted by a number of time stamps, as shown by the shifted sequence 105c. The shifted sequence 105c is sent to the loss module 180 for computing the shifted masked reconstruction loss. Thus, by engaging the right-shifted sequence 105 instead of using the input sequence 105a directly in loss computation, the shifted sequence 105c may enforce the neural model to more closely learn the future information.

For example, the masked reconstruction loss may be computed as $$R_n = \|(1 - M^{\rightarrow n}) \odot (X^{\rightarrow n} - g(f(X \odot M)))\|_{frob}^2$$

where →n means right-shifting n time stamps, ⊙ denotes element-wise multiplication, and frob denotes the Frobenius Norm. When n=0, $R_n$ coincides with the traditional masked reconstruction loss.

Referring to FIG. 1, the shifted reconstruction loss 180 is then sent to the combined loss module 190, which in turn computes the combined loss based on the mutual information and the masked reconstruction loss:

$$L_{n,T}(X) = R_n + \alpha I_T = \|(1 - M^{\rightarrow n}) \odot (X^{\rightarrow n} - g(f(X \odot M)))\|_{frob}^2 + \alpha \left[ \ln \left| \sum_T (Y) \right| - \frac{1}{2} \left| \sum_{2T} (Y) \right| \right]$$

where α trades off the weights between the mutual information loss and the shifted masked reconstruction loss. n, T are hyperparameters. The combined loss may then be used to update the base model 125, e.g., via the backpropagation path 195.

Computer Environment

Figure 4:
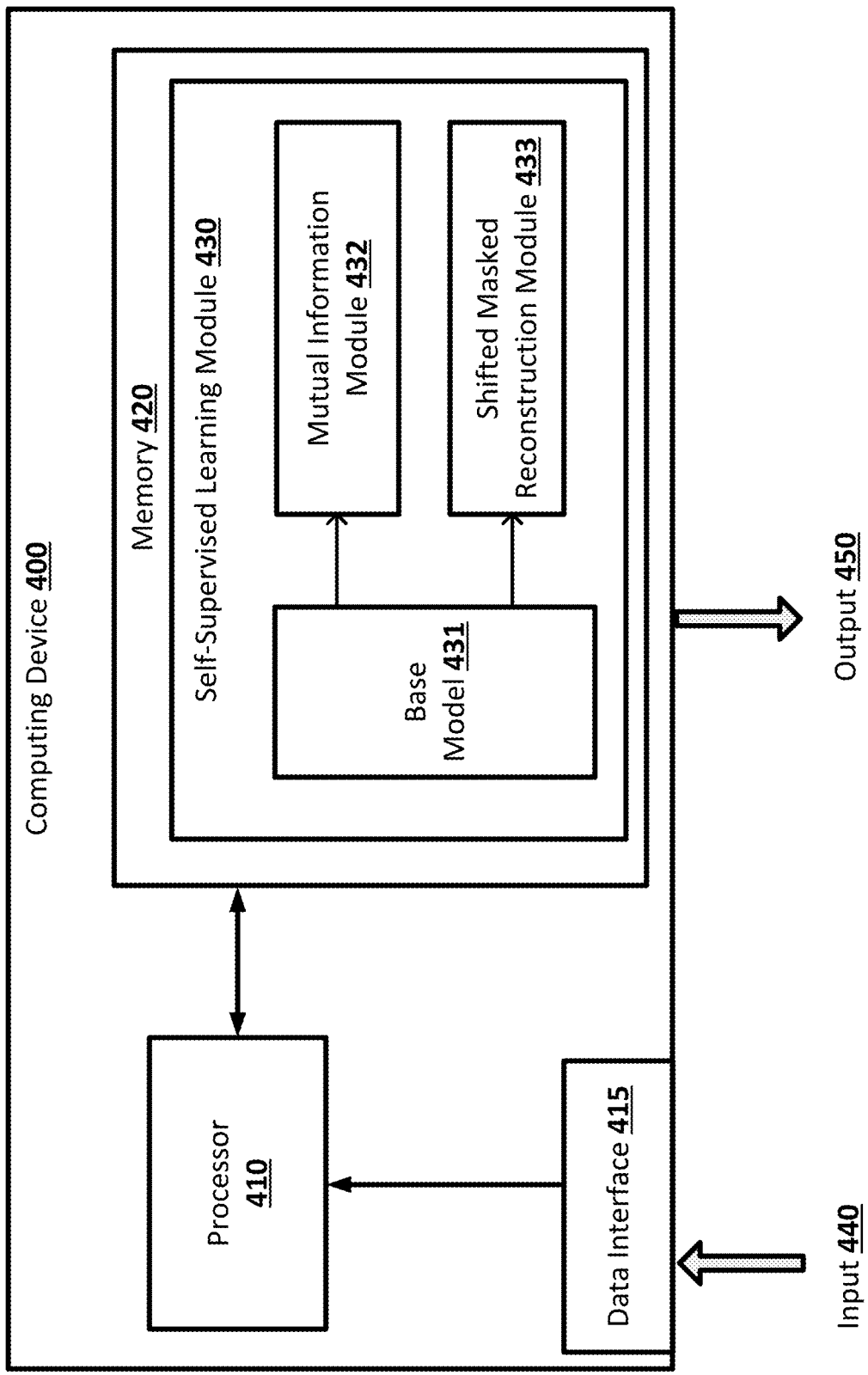
FIG. 4 is a simplified diagram of a computing device for implementing the self-supervised learning module, according to some embodiments described herein.

FIG. 4 is a simplified diagram of a computing device for implementing the self-supervised learning module, according to some embodiments. As shown in FIG. 4, computing device 400 includes a processor 410 coupled to memory 420. Operation of computing device 400 is controlled by processor 410. And although computing device 400 is shown with only one processor 410, it is understood that processor 410 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 400. Computing device 400 may be implemented as a stand-alone subsystem, as a board added to a computing device, and/or as a virtual machine.

Memory 420 may be used to store software executed by computing device 400 and/or one or more data structures used during operation of computing device 400. Memory 420 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 410 and/or memory 420 may be arranged in any suitable physical arrangement. In some embodiments, processor 410 and/or memory 420 may be implemented on a same board, in a same package (e.g., system-in-package), on a same chip (e.g., system-on-chip), and/or the like. In some embodiments, processor 410 and/or memory 420 may include distributed, virtualized, and/or containerized computing resources. Consistent with such embodiments, processor 410 and/or memory 420 may be located in one or more data centers and/or cloud computing facilities.

In some examples, memory 420 may include non-transitory, tangible, machine readable media that includes executable code that when run by one or more processors (e.g., processor 410) may cause the one or more processors to perform the methods described in further detail herein. For example, as shown, memory 420 includes instructions for a self-supervised learning module 430 that may be used to implement and/or emulate the systems and models, and/or to implement any of the methods described further herein. In some examples, the self-supervised learning module 430 may be used to receive and handle the input 440 via a data interface 415. For example, the input 440 may include a sequentially input data sequence, such as a natural language sentence, etc. The self-supervised learning module 430 may generate an output 450, e.g., such as a natural language response in response to the input 440 of a natural language question. In some examples, the self-supervised learning module 430 may also handle the iterative training and/or evaluation of a system or model.

In some embodiments, the self-supervised learning module 430 includes a base neural model 431, a mutual information module 432, and a shifted masked reconstruction module 433. The base model 431 may be a language model, which receives an input 440 of a natural language sentence via the data interface 415. The mutual information module 432 is configured to compute the mutual information of the input in the latent space. The shifted masked reconstruction module 433 is configured to randomly masked the input sequence 440, and compare an output from the base model 431 in response to the randomly masked input sequence 440 with a right shifted input to compute a shifted reconstruction loss.

The modules and/or submodules 431-433 may be serially connected as shown in FIG. 4 or connected in other manners.

In some examples, the self-supervised learning module 430 and the sub-modules 431-433 may be implemented using hardware, software, and/or a combination of hardware and software.

Self-Supervised Learning Method

Figure 5:
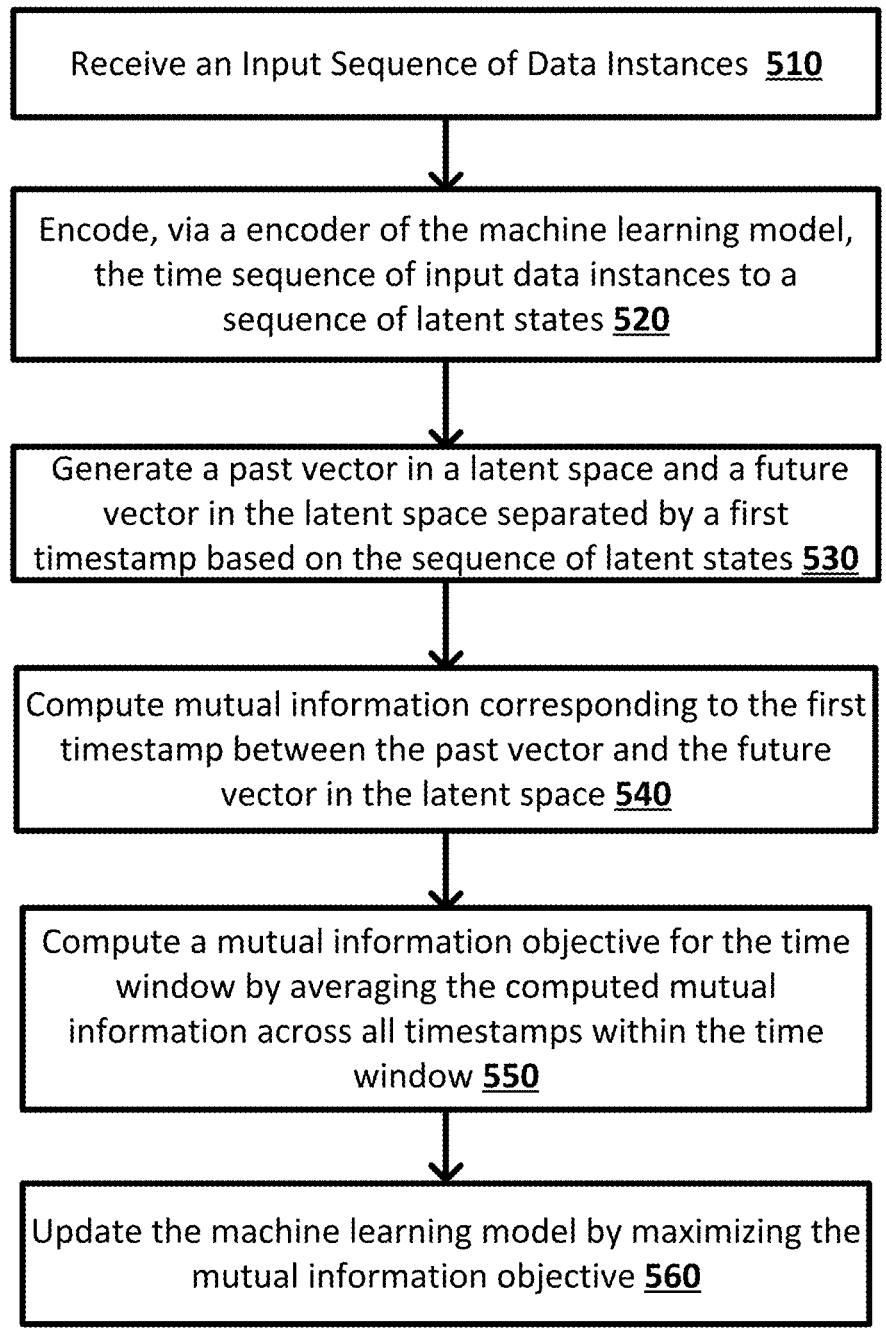
FIG. 5 is a simplified logic flow diagram illustrating a method for mutual information learning in the latent space, according to some embodiments.

FIG. 5 is a simplified logic flow diagram illustrating a method for mutual information learning in the latent space, according to some embodiments. One or more of the processes 510-590 of method 500 may be implemented, at least in part, in the form of executable code stored on non-transitory, tangible, machine-readable media that when run by one or more processors may cause the one or more processors to perform one or more of the processes 510-590. In some embodiments, method 500 may correspond to the method used by the self-supervised learning module 430.

At process 510, an input sequence of data instances is received. For example, an input 440 is received via a data interface 415 as shown in FIG. 4. The data interface 415 may be a user interface that receive a user input, such as a user entered sentence, a user articulated utterance, etc., or the data interface 415 may be a communication interface that receives a training sequence from a database. In one implementations, the data instance may be a word, a letter, a token or any data unit.

At process 520, the time sequence of input data instances to a sequence of latent states is encoded, via an encoder of the machine learning model. For example, as shown in FIG. 2, the input sequence 105 of data instances are encoded into a latent space representation.

At process 530, a past vector in a latent space and a future vector in the latent space are generated, separated by a first timestamp based on the sequence of latent states. For example, given the time stamp t, the past states 206 and the future states 208 are generated in the latent space.

At process 540, the mutual information corresponding to the first timestamp between the past vector and the future vector in the latent space is generated. For example, the mutual information 210 is computed based on the past states 206 and the future states 208.

At process 550, a mutual information objective is computed for the time window by averaging the computed mutual information across all timestamps within the time window. For example, the latent state representations 135 are assumed to form a Gaussian process and the mutual information in the latent space is estimated by averaging across all the time stamps.

At process 560, the machine learning model is updated by maximizing the mutual information objective. In one implementation, the machine learning model may be updated based solely on the mutual information objective. In another implementation, the mutual information objective may be combined with the shifted masked reconstruction loss as described in FIG. 6.

Figure 6:
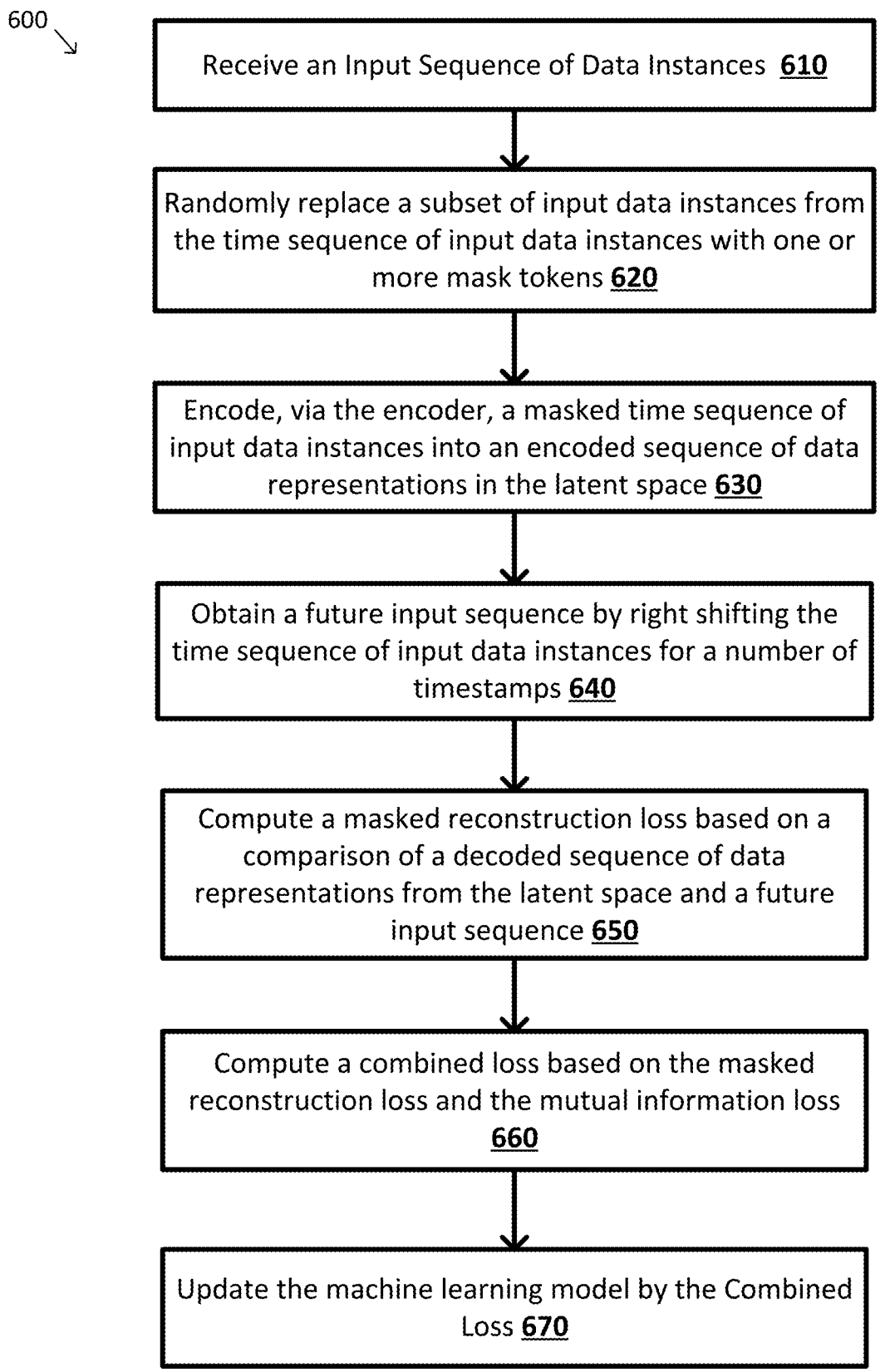
FIG. 6 is a simplified logic flow diagram illustrating a method for shifted masked reconstruction, according to some embodiments.

FIG. 6 is a simplified logic flow diagram illustrating a method for shifted masked reconstruction, according to some embodiments. One or more of the processes 610-690 of method 600 may be implemented, at least in part, in the form of executable code stored on non-transitory, tangible, machine-readable media that when run by one or more processors may cause the one or more processors to perform one or more of the processes 610-690. In some embodiments, method 600 may correspond to the method used by the self-supervised learning module 430.

At process 610, an input sequence of data instances is received. For example, an input 440 is received via a data interface 415 as shown in FIG. 4. The data interface 415 may be a user interface that receive a user input, such as a user entered sentence, a user articulated utterance, etc., or the data interface 415 may be a communication interface that receives a training sequence from a database. In one implementations, the data instance may be a word, a letter, a token or any data unit.

At process 620, a subset of input data instances are randomly replaced from the time sequence of input data instances with one or more mask tokens. For example, as shown in FIG. 3, a masked sequence 105b is formed from the input sequence 105a.

At process 630, a masked time sequence of input data instances are encoded into an encoded sequence of data representations in the latent space.

At process 640, a future input sequence is obtained by right shifting the time sequence of input data instances for a number of timestamps. For example, the shifted sequence 105c is obtained from the input sequence 105a by right shifting two time stamps.

At process 650, a masked reconstruction loss is computed based on a comparison of a decoded sequence of data representations from the latent space and a future input sequence, e.g., as described in computing $R_n$ in relation to FIG. 1.

At process 660, a combined loss may be computed based on the masked reconstruction loss and the mutual information loss, e.g., by taking a weighted sum.

At process 670, the machine learning model may be updated by the combined loss.

In one embodiment, the shifted masked reconstruction learning and the mutual information learning may be implemented concurrently, jointly, alternately or independently. For example, the same batch of training samples may be first used to obtain the mutual information loss, and then subsequently be perturbed for shifted masked reconstruction learning. For another example, a first batch of training samples may be used for mutual information learning, and then the next batch may be used for shifted masked reconstruction learning, the two of which may be implemented alternately.

Example Performance

Figure 7A:
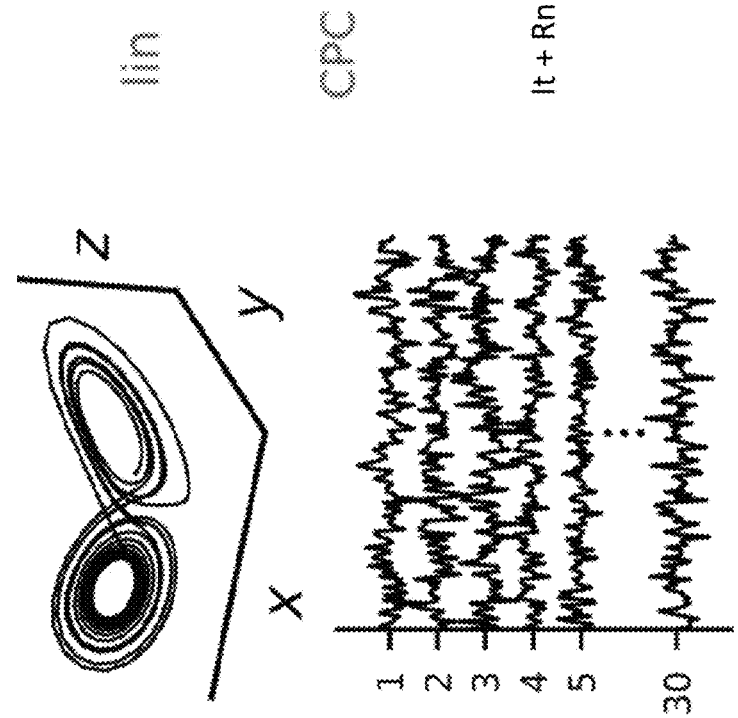
FIGS. 7A-7C provide example data charts illustrating a data experiment illustrating performance of the joint mutual information and shifted masked reconstruction learning, according to one embodiment described herein.
Figure 7B:
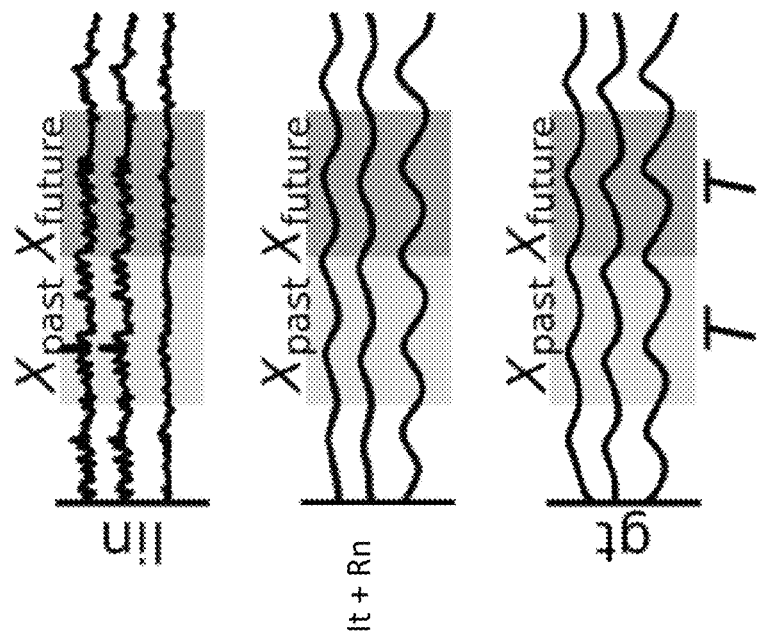
Figure 7C:
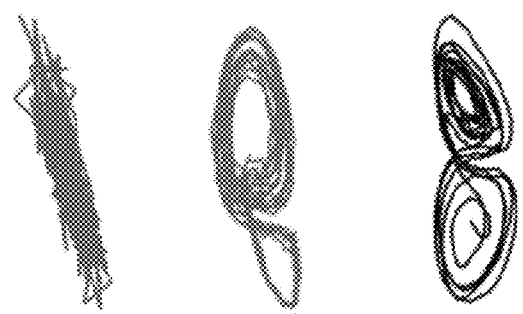

FIGS. 7A-7C provide example data charts illustrating a data experiment illustrating performance of the joint mutual information and shifted masked reconstruction learning, according to one embodiment described herein. Two datasets are used, e.g., Lorenz Attractor and Automatic Speech Recognition (ASR). Lorenz Attractor is a time series data in physics. For quantitative performance, large-scale ASR dataset is used, e.g., Wall Street Journal (WSJ).

For example, FIG. 7A shows raw Lorenz Attractor time series data and non-linearly lifted 30-d noisy data. The 30-d signals can be rather chaotic. The raw 3-d clean signals are lifted to 30-d signals by a non-linear Neural Network with 2 hidden layers. Furthermore, white noise is added to the lifted signals. The resulting signals can thus be rather messy, as shown in FIG. 7A, and it is generally hard to uncover the underlying true 3-d Lorenz Attractor signals.

FIG. 7B shows the recovery performances of linear DCA, contrastive predictive coding compared with the shifted masked reconstruction learning combined with mutual information learning as described herein. Three methods for comparison, linear DCA (see Clark et al.), CPC (see Oord et al., Representation learning with contrastive predictive coding, arXiv preprint arXiv:1807.03748, 2018) and the shifted masked reconstruction learning combined with mutual information learning as described herein. Linear DCA completely fails in this scenario. CPC is able to recover 2 circles, but the shapes and sizes of the two circles are far away from the ground-truth. The proposed method can basically recover the 3-d Lorenz Attractor signals with similar shapes, sizes and curves, and delivers the best recovery performances. FIG. 7C compares the recovered Lorenz Attractor signals and the ground-truth signals, and show that the shifted masked reconstruction learning combined with mutual information learning is very close to ground truth.

The proposed shifted masked reconstruction learning combined with mutual information learning is also applied to large-scale ASR dataset, Wall Street Journal (WSJ). For example, pretraining of the experiment model is performed on si84 partition (81 hours) of WSJ dataset, and the model is fine tuned on si84 partition (15 hours). The model is tested on eval92 split which contains 333 utterances. 8 V100 gpus is used for the whole training process, and the weight $\alpha$ is set to be 0.002 in the experiments. The masks are randomly generated for each batch of utterances.

The proposed method is compared with a) the baseline, which has no pretraining, b) the model pretrained on si284 using traditional masked reconstruction. The results are collected in Table 1.

TABLE 1

CER and WER Evaluation Performances on eval92

| | WO Pretrain | Masked Reconstruction Pretrain | Proposed Method |
|---|---|---|---|
| CER | 4.3 | 3.7 | 3.4 |
| WER | 9.5 | 8.1 | 7.5 |

The proposed method brings 20.5% and 20.05% improvement on top of the baseline without pretraining with respect to CER and WER. Even compared with the model pretrained using masked reconstruction, the proposed method improves CER and WER by 8.1% and 7.4% respectively. Therefore, the proposed shifted masked reconstruction learning combined with mutual information learning outperforms the baseline and other pretrained models.

Some examples of computing devices, such as computing device 400 may include non-transitory, tangible, machine readable media that include executable code that when run by one or more processors (e.g., processor 410) may cause the one or more processors to perform the processes of methods 500-600. Some common forms of machine readable media that may include the processes of methods 500-600 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A system for training a neural network model to generate a time series prediction, the system comprising:
   a memory configured to store a neural network model comprising a bi-directional long short-term memory (LSTM) encoder and a decoder, and a plurality of processor-executable instructions;
   an input interface configured to receive a time sequence of input data instances over a time window corresponding to a window size;
   a processor configured to execute the plurality of processor-executable instructions to:
   encode, by the bi-directional LSTM encoder of the neural network model implemented on one or more hardware processors, the time sequence of input data instances to a sequence of latent states in a latent space;
   dividing the sequence of latent states into a past vector in the latent space and a future vector in the latent space separated by a first timestamp;
   compute mutual information corresponding to the first timestamp between the past vector of a first subset of the sequence of latent states before the first timestamp and the future vector of a second subset of the sequence of latent states after the first timestamp in the latent space;
   compute a mutual information objective for the time window by averaging the computed mutual information with the first timestamp taking a value across all timestamps within the time window;
   train the neural network model of the bi-directional LSTM encoder and the decoder by updating parameters of the neural network model based on at least the mutual information objective via backpropagation; and
   generate, by the decoder of the trained neural network model, an output time series prediction having a first sequence of tokens representing data points over a future time window in response to an input having a second sequence of tokens representing observations in a past time window.

2. The system of claim 1, wherein the time sequence of input data instances are embedded by a feature extractor to a low-dimensional space, and
   wherein each of the sequence of latent states has a size based on a dimension of the low-dimensional space and the window size.

3. The system of claim 1, wherein the set of latent states form a Gaussian process.

4. The system of claim 3, wherein the mutual information objective is computed by estimating an entropy of the past vector or the future vector in the latent space according to the Gaussian process.

5. The system of claim 1, wherein the processor is further configured to:
   randomly replace a subset of input data instances from the time sequence of input data instances with one or more mask tokens;
   encode, via the encoder, a masked time sequence of input data instances into an encoded sequence of data representations in the latent space;
   compute a masked reconstruction loss based on a comparison of a decoded sequence of data representations from the latent space and a future input sequence, wherein the future input sequence is obtained by right shifting the time sequence of input data instances for a number of timestamps.

6. The system of claim 5, wherein the masked reconstruction loss is computed by further right shifting a binary mask for the number of timestamps and applying the right shifted binary mask to the comparison of the decoded sequence and the future input sequence.

7. The system of claim 5, wherein the processor is further configured to:
compute a combined objective based on a weighted sum of the masked reconstruction loss and the mutual information objective; and
update the neural network model using the combined objective.

8. A method for training a neural network model to generate a time series prediction, the method comprising:
receiving, via a data interface, a time sequence of input data instances over a time window corresponding to a window size;
encoding, via a bi-directional long short-term memory (LSTM) encoder of the neural network model implemented on one or more hardware processors, the time sequence of input data instances to a sequence of latent states in a latent space;
generating a past vector in the latent space and a future vector in the latent space separated by a first timestamp based on the sequence of latent states;
computing mutual information corresponding to the first timestamp between the past vector of a first subset of the sequence of latent states before the first timestamp and the future vector of a second subset of the sequence of latent states after the first timestamp in the latent space;
computing a mutual information objective for the time window by averaging the computed mutual information with the first timestamp taking a value across all timestamps within the time window;
training the neural network model of the bi-directional LSTM encoder and the decoder by updating parameters of the neural network model based on at least the mutual information objective via backpropagation; and
generating, by the decoder of the trained neural network model, an output time series prediction having a first sequence of tokens representing data points over a future time window in response to an input having a second sequence of tokens representing observations in a past time window.

9. The method of claim 8, wherein the time sequence of input data instances are embedded by a feature extractor to a low-dimensional space, and
wherein each of the sequence of latent states has a size based on a dimension of the low-dimensional space and the window size.

10. The method of claim 8, wherein the set of latent states form a Gaussian process.

11. The method of claim 10, wherein the mutual information objective is computed by estimating an entropy of the past vector or the future vector in the latent space according to the Gaussian process.

12. The method of claim 8, further comprising:
randomly replacing a subset of input data instances from the time sequence of input data instances with one or more mask tokens;
encoding, via the encoder, a masked time sequence of input data instances into an encoded sequence of data representations in the latent space;
computing a masked reconstruction loss based on a comparison of a decoded sequence of data representations from the latent space and a future input sequence, wherein the future input sequence is obtained by right shifting the time sequence of input data instances for a number of timestamps.

13. The method of claim 12, wherein the masked reconstruction loss is computed by further right shifting a binary mask for the number of timestamps and applying the right shifted binary mask to the comparison of the decoded sequence and the future input sequence.

14. The method of claim 12, further comprising:
computing a combined objective based on a weighted sum of the masked reconstruction loss and the mutual information objective; and
updating the neural network model using the combined objective.

15. A non-transitory processor-readable storage medium storing processor-executable instructions for training a neural network model to generate a time series prediction, the instructions being executed by a processor to perform operations comprising:
receiving, via a data interface, a time sequence of input data instances over a time window corresponding to a window size;
encoding, via a bi-directional long short-term memory (LSTM) encoder of the neural network model implemented on one or more hardware processors, the time sequence of input data instances to a sequence of latent states in a latent space;
generating a past vector in the latent space and a future vector in the latent space separated by a first timestamp based on the sequence of latent states;
computing mutual information corresponding to the first timestamp between the past vector of a first subset of the sequence of latent states before the first timestamp and the future vector of a second subset of the sequence of latent states after the first timestamp in the latent space;
computing a mutual information objective for the time window by averaging the computed mutual information with the first timestamp taking a value across all timestamps within the time window;
training the neural network model of the bi-directional LSTM encoder and a decoder by updating parameters of the neural network model based on at least the mutual information objective via backpropagation; and
generating, by the decoder of the trained neural network model, an output time series prediction having a first sequence of tokens representing data points over a future time window in response to an input question having a second sequence of tokens representing observations in a past time window.

16. The medium of claim 15, wherein the time sequence of input data instances are embedded by a feature extractor to a low-dimensional space, and
wherein each of the sequence of latent states has a size based on a dimension of the low-dimensional space and the window size.

17. The medium of claim 15, wherein the set of latent states form a Gaussian process, and wherein the mutual information objective is computed by estimating an entropy of the past vector or the future vector in the latent space according to the Gaussian process.

18. The medium of claim 15, wherein the operations further comprise:
randomly replacing a subset of input data instances from the time sequence of input data instances with one or more mask tokens;
encoding, via the encoder, a masked time sequence of input data instances into an encoded sequence of data representations in the latent space; and
computing a masked reconstruction loss based on a comparison of a decoded sequence of data representations from the latent space and a future input sequence, wherein the future input sequence is obtained by right shifting the time sequence of input data instances for a number of timestamps.

19. The medium of claim 18, wherein the masked reconstruction loss is computed by further right shifting a binary mask for the number of timestamps and applying the right shifted binary mask to the comparison of the decoded sequence and the future input sequence.

20. The medium of claim 18, wherein the operations further comprise:
   computing a combined objective based on a weighted sum of the masked reconstruction loss and the mutual information objective; and
   updating the neural network model using the combined objective.

* * * * *